March 6, 1928.                    H. F. PRIVETT                    1,661,679
                                METAL TIRE COVER
                        Filed Oct. 5, 1926           2 Sheets-Sheet 1
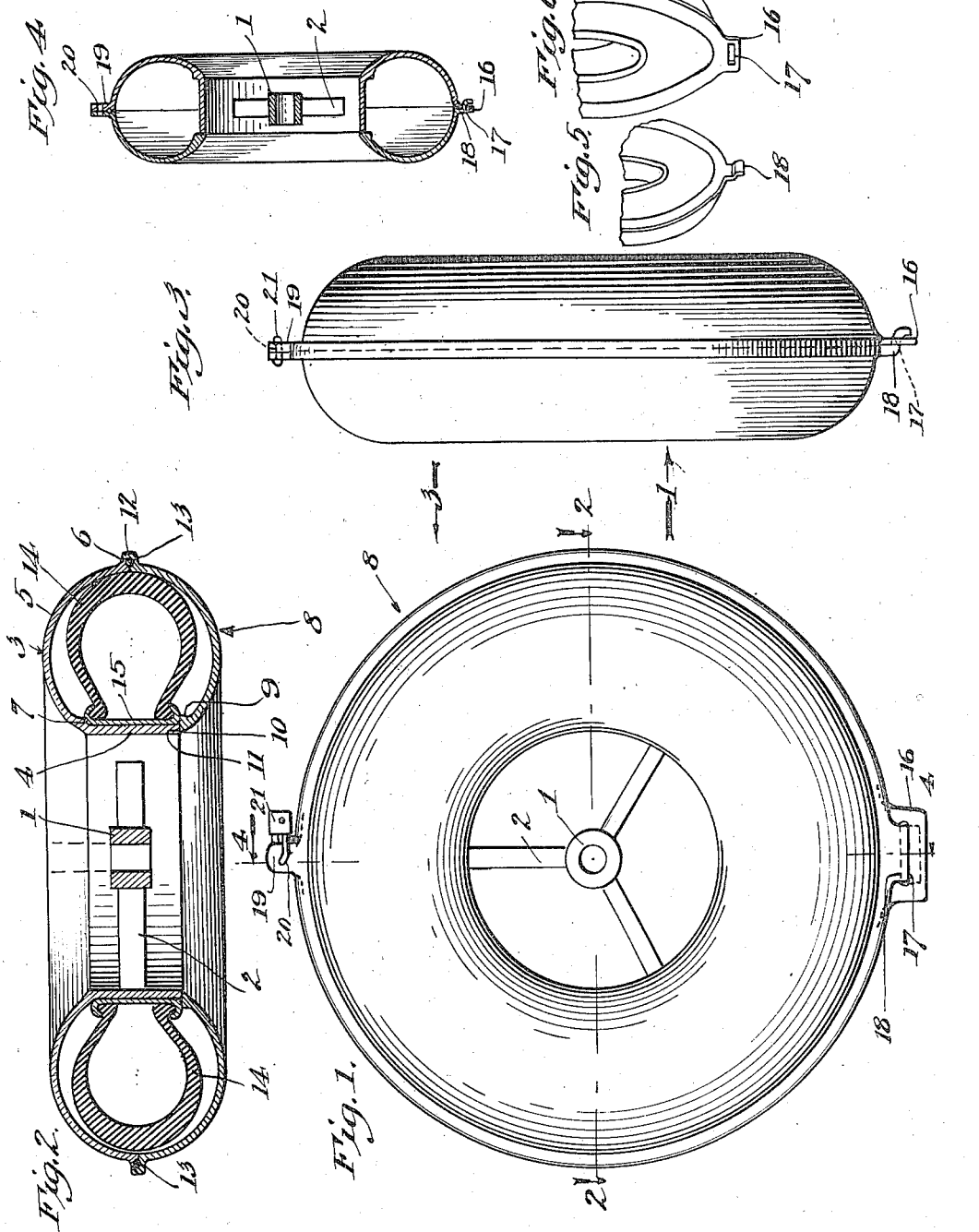

March 6, 1928.
H. F. PRIVETT
METAL TIRE COVER
Filed Oct. 5, 1926
1,661,679
2 Sheets-Sheet 2
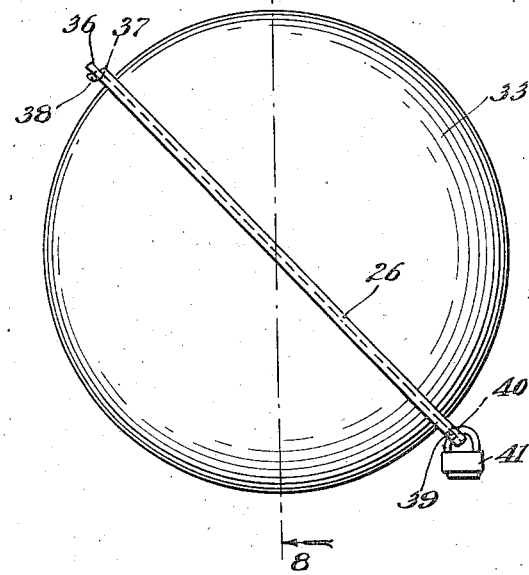
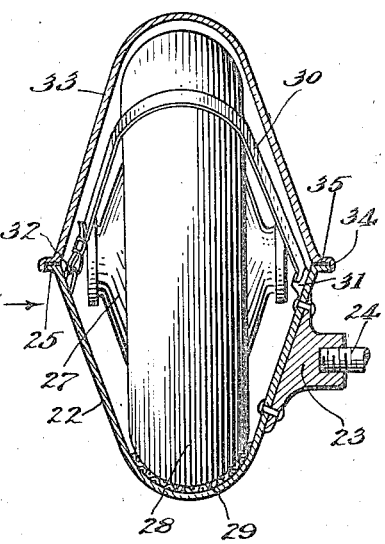
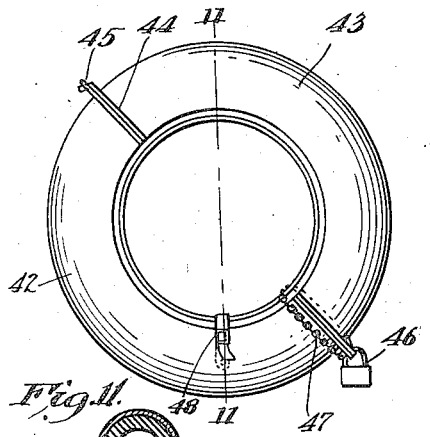
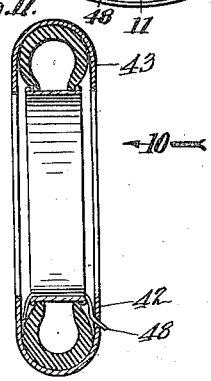
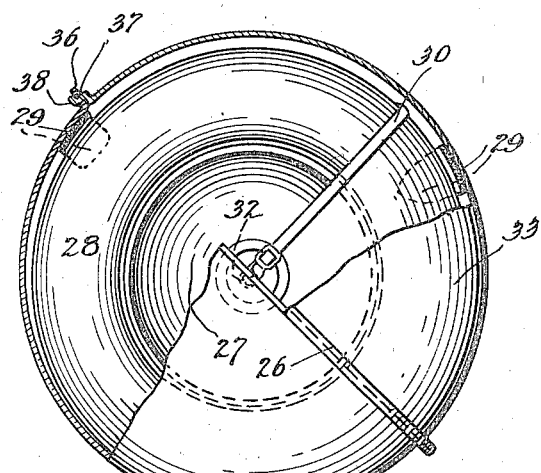

Patented Mar. 6, 1928.

1,661,679

UNITED STATES PATENT OFFICE.

HOLLIS F. PRIVETT, OF LONG BEACH, CALIFORNIA.

METAL TIRE COVER.

Application filed October 5, 1926. Serial No. 139,595.

My invention is a metal tire cover to incase and hold pneumatic tires for automobiles or the like.

An object of my invention is the construction of a metal tire case for pneumatic tires to completely incase the tire and also in some types form the carrier for the tire and rim or for a complete wheel with the tire thereon. In another form of construction the cover merely incases the tire, the rim being intended to be supported by the ordinary rim carrier.

A more specific object of my invention is the construction of a metal tire cover formed in a plurality of sections, whereby these may be readily clamped together and locked, thus securely housing the tire and the rim to which it is attached or a complete wheel with the tire. In constructing the case in a plurality of sections the case may be split circumferentially or may be split on a diameter, the sections at the joint being made preferably water tight.

My invention is illustrated in the following drawings, in which;

Figure 1 is a side elevation of one type of metal tire cover as if taken in the direction of the arrow 1 of Fig. 3;

Fig. 2 is a horizontal section taken on the line 2—2 of Fig. 1 in the direction of the arrows;

Fig. 3 is an edge elevation taken in the direction of the arrow 3 of Fig. 1;

Fig. 4 is a vertical transverse section on the line 4—4 of Fig. 1, in the direction of the arrows;

Fig. 5 is a perspective detail of the outer cover section, showing a tongue forming part of the fastening;

Fig. 6 is a perspective view of the stationary part of the cover showing a portion having a slot to engage the tongue of Fig. 5 to form part of the fastening;

Fig. 7 is an alternative construction having sections of the cover with a diametrical joint and particularly adapted for housing a complete wheel with a tire thereon;

Fig. 8 is a vertical section on the line 8—8 of Fig. 7 in the direction of the arrows;

Fig. 9 is an elevation similar to Fig. 7, partly broken away;

Fig. 10 is a side elevation of an alternative construction taken in the direction of the arrow 10 of Fig. 11, showing the cover forming a casing for the tire only;

Fig. 11 is a section on the line 11—11 of Fig. 10.

Referring first to the construction of Figs. 1 to 6, a hub 1 has a series of spokes 2 connected to same forming a spider, the hub being adapted to be supported on a stud or the like attached to a vehicle. The fixed part of the cover is designated generally by the numeral 3 and has an annular base portion 4 secured to the spokes, this portion being cylindrical. A curved half cover section 5 extends outwardly from the portion 4 and has a bead 6 at its outer periphery. A slight ridge 7 is formed on the inner portion for a purpose hereunder set forth.

The removable section of the cover designated generally by the numeral 8 has an inner bead 9 and a circumferential edge 10, the edge 10 being adapted to fit tightly against the edge 11 of the cylindrical portion 4 of the stationary part of the cover. A flange 12 on the outer periphery of the removable section fits over the bead 6, there being a ring packing 13 of suitable soft material forming a water-tight joint and a sound deadener. The pneumatic tire 14 is illustrated as being mounted on a rim 15, the rim fitting on the outside surface of the cylindrical portion 4 and fitting against the ridge 7 and the bead 9.

The fixed portion of the cover has an extension 16 preferably at the lower edge with a slot 17 therein and the removable section has a tongue 18 having a slight bend therein as shown in Fig. 3 to engage the slot 17. The upper portions of both of the sections have lugs 19 with apertures 20 therethrough with which a padlock 21 or the like may be secured.

In utilizing the cover of the type of Figs. 1 to 6, the fixed part of the cover being supported by the vehicle forms a rim carrier, the rim snugly fitting in position and holding the tire in proper relation to the cover. The removable section can then be secured in place by inter-engaging the tongue 18 in the slot 17 and after registry of the apertures 20 securing a padlock or the like through same. Thereby the rim and tire are securely held in position and the tire is completely incased in the metal cover, the circumferential joint on account of the packing forming substantially a water-tight joint.

In the construction of Figs. 7, 8 and 9, the stationary part of the cover is designated by the numeral 22 and is formed somewhat trough-shaped and has a block 23 secured on one side of the same to which a stud 24 may be secured forming the support for the cover and the wheel or tire housed therein. This form of cover has a rim 25 forming a diametrical joint as indicated by the numeral 26.

In this construction a wheel 27 having a tire 28 secured thereon is adapted to rest in the lower part of the cover, there being strips of felt 29 or other suitable material forming a protective padding. One or more straps 30 secured to eyes 31 at the inner portion of the stationary cover section are passed over the tire and fastened through the eye 32 on the other side of the cover trough, these straps being secured by a buckle or the like.

The removable section of the cover is designated generally by the numeral 33 and is formed substantially complementary in shape to the stationary portion, having however, a downturned flange 34 at its edge, such flange fitting over the flange 25 of the stationary section. There is preferably a suitable packing 35 of sound deadening material and also adapted to make a substantially water tight joint.

The locking features are provided by an extension 36 preferably on the stationary section having a slot 37 therethrough in which fits a tongue 38 on the rim of the removable section. Lugs 39 are formed on the opposite part of the rims and have apertures 40 therethrough to which a padlock 41 may be secured.

In using the cover of Figs. 7, 8 and 9, the wheel with a tire thereon or a tire with a rim may be placed in the lower or trough-like part of the cover with the tire resting on felts 29 and after securely strapping same in place the removable section 33 is secured in position by inter-engaging the tongue 38 in the slot 37 and attaching the padlock.

In the construction of Figs. 10 and 11, the cover is formed with complementary U-shaped trough sections 42 and 43, these being merely sufficient in depth to cover the tire, leaving the rim of the tire exposed for attaching to a rim carrier or the like. These sections have cooperating rims 44 preferably formed somewhat as shown in Figs. 7, 8 and 9 and have interlocking tongue and slot connections 45 and an arrangement 46 for attaching the padlock. In this case the padlock is illustrated as having a chain 47 securing the cover to the rim and such chain also may be utilized to secure the rim to a tire carrier. In this case the strap 48 is illustrated as being secured to one of the cover sections passing over the rim and thus securely strapping the rim and tire in the trough-like cover.

In this construction it will be noted that the joint is on a diametrical line. Therefore the two sections may be readily attached over a tire after same has been secured in a tire carrier or the like.

Although I have illustrated my invention in several forms for forming a complete cover for a rim with a tire or a tire with a wheel and for a partial cover for a tire, it will be understood that the design may be changed materially in general construction or in specific details to form different types of tire covers. Such changes would be within the spirit of my invention as set forth in the description, drawings and claims.

While I have designated the tire cover as being formed of metal, it is obvious that this could be made of other sheet material such as fibre or the like molded to shape or otherwise constructed in the shape desired.

Having described my invention, what I claim is:

1. A tire cover comprising in combination a lower trough like structure having a flange at its upper edge, said structure being curved on the bottom to conform to a vehicle tire, an upper trough like structure complementary to the lower structure and having a flange with a downturned edge, the flanges of both structures engaging and the downturned edge fitting over the lower flange, both flanges having apertures therethrough for securing a padlock, and one of the flanges having a tongue and the other a slot to receive the tongue.

2. A tire cover comprising a lower metal trough like section having an upper flange extending around the edge of such structure, the flange being in a single plane, a complementary trough like structure having a flange to fit against the flange of the lower section and having downturned edges extending over the lower flange, both of the flanges having apertures in alignment to secure a padlock, and one of the flanges having a tongue fitting in a slot in the other flange.

In testimony whereof I have signed my name to this specification.

HOLLIS F. PRIVETT.